(12) United States Patent
Ji et al.

(10) Patent No.: US 7,461,878 B2
(45) Date of Patent: Dec. 9, 2008

(54) ENERGY ABSORBING VEHICLE BUMPER BRACKET

(75) Inventors: Hongliang Ji, Farmington Hills, MI (US); Mohan Parthasarathy, Macomb, MI (US); Regu Ramoo, Troy, MI (US)

(73) Assignee: Continental Structural Plastics, Troy, MI (US)

( * ) Notice: Subject to any disclaimer, the term of this patent is extended or adjusted under 35 U.S.C. 154(b) by 0 days.

(21) Appl. No.: 11/597,778

(22) PCT Filed: May 25, 2005

(86) PCT No.: PCT/US2005/018384

§ 371 (c)(1),
(2), (4) Date: Aug. 1, 2007

(87) PCT Pub. No.: WO2005/118346

PCT Pub. Date: Dec. 15, 2005

(65) Prior Publication Data

US 2008/0036225 A1    Feb. 14, 2008

Related U.S. Application Data

(60) Provisional application No. 60/574,401, filed on May 26, 2004.

(51) Int. Cl.
*B60R 19/04* (2006.01)
(52) U.S. Cl. ...................... 293/154; 293/155
(58) Field of Classification Search ............... 293/154, 293/155
See application file for complete search history.

(56) References Cited

U.S. PATENT DOCUMENTS

| | | | | |
|---|---|---|---|---|
| 3,880,455 | A | * | 4/1975 | Toemmeraas ............ 293/155 |
| 6,113,164 | A | * | 9/2000 | Setina ..................... 293/154 |
| 6,435,579 | B1 | * | 8/2002 | Glance .................... 293/155 |

* cited by examiner

*Primary Examiner*—Lori L Lyjak
(74) *Attorney, Agent, or Firm*—Rader, Fishman & Grauer PLLC

(57) ABSTRACT

A vehicle bumper system having a mounting bracket disposed between a vehicle frame and a bumper having angulated walls. The angulated walls are disposed at selected cross-sectional elevations, to avoid parallelograming under impact and provide maximum energy absorption. The mounting bracket includes a first surface and a second surface. The first surface of mounting bracket is adapted to be secured to the vehicle frame. The second surface of the mounting bracket is adapted to be secured to the bumper. The walls of the mounting bracket absorb an impact to the bumper.

19 Claims, 11 Drawing Sheets

ENERGY ABSORBING VEHICLE BUMPER BRACKET

CROSS-REFERENCE TO RELATED APPLICATIONS

This application claims priority to U.S. Provisional Application 60/574,401, filed on May 26, 2004, which is incorporated herein by reference in its entirety.

TECHNICAL FIELD

The embodiments described herein relate generally to vehicle bumper systems adapted to provide impact strength and energy absorption. In particular, the embodiments relate to an energy absorbing bumper bracket for attaching a bumper to a vehicle frame.

BACKGROUND

Vehicle bumper systems generally include a bumper beam that is transversely mounted to a vehicle frame using a mounting bracket. Energy absorption is particularly desirable during low speed bumper impacts (i.e., up to about 5 miles per hour), because an important purpose of the bumper system is to absorb energy before the vehicle frame itself begins to undergo damage. A limitation of many bumper beam mounting bracket designs is that they do not adequately absorb impact energy applied to the vehicle bumper system. In many automotive applications, the bumper beam itself, and an optional polymeric foam applied to the face of the bumper beam, generally function as the sole energy absorbing components in the bumper system. Thus, energy applied to the bumper system in excess of the energy dissipation capability of the bumper beam and polymeric foam is transferred through the mounting bracket into the vehicle frame. As a result, significant and expensive damage may occur to a vehicle's frame, even in relatively low speed bumper impacts.

Therefore, a need exists for a vehicle bumper system that includes an energy absorbing mounting bracket that significantly contributes to the overall energy dissipation capability of the vehicle bumper system.

BRIEF SUMMARY

The embodiments described herein are directed to an energy absorbing mounting bracket having angulated walls, the mounting bracket being adapted for attaching a bumper to a vehicle frame. The angulated walls are disposed at selected cross-sectional elevations to avoid parallelograming under impact and provide maximum energy absorption. The mounting bracket includes a first surface and a second surface. The first surface of mounting bracket is adapted to be secured to the vehicle frame. The second surface of the mounting bracket is adapted to be secured to the bumper. The walls of the mounting bracket absorb an impact to the bumper.

BRIEF DESCRIPTION OF THE DRAWINGS

The features and inventive aspects of the embodiments described herein will become more apparent upon reading the following detailed description, claims, and drawings, of which the following is a brief description:

DETAILED DESCRIPTION

Figure 1:
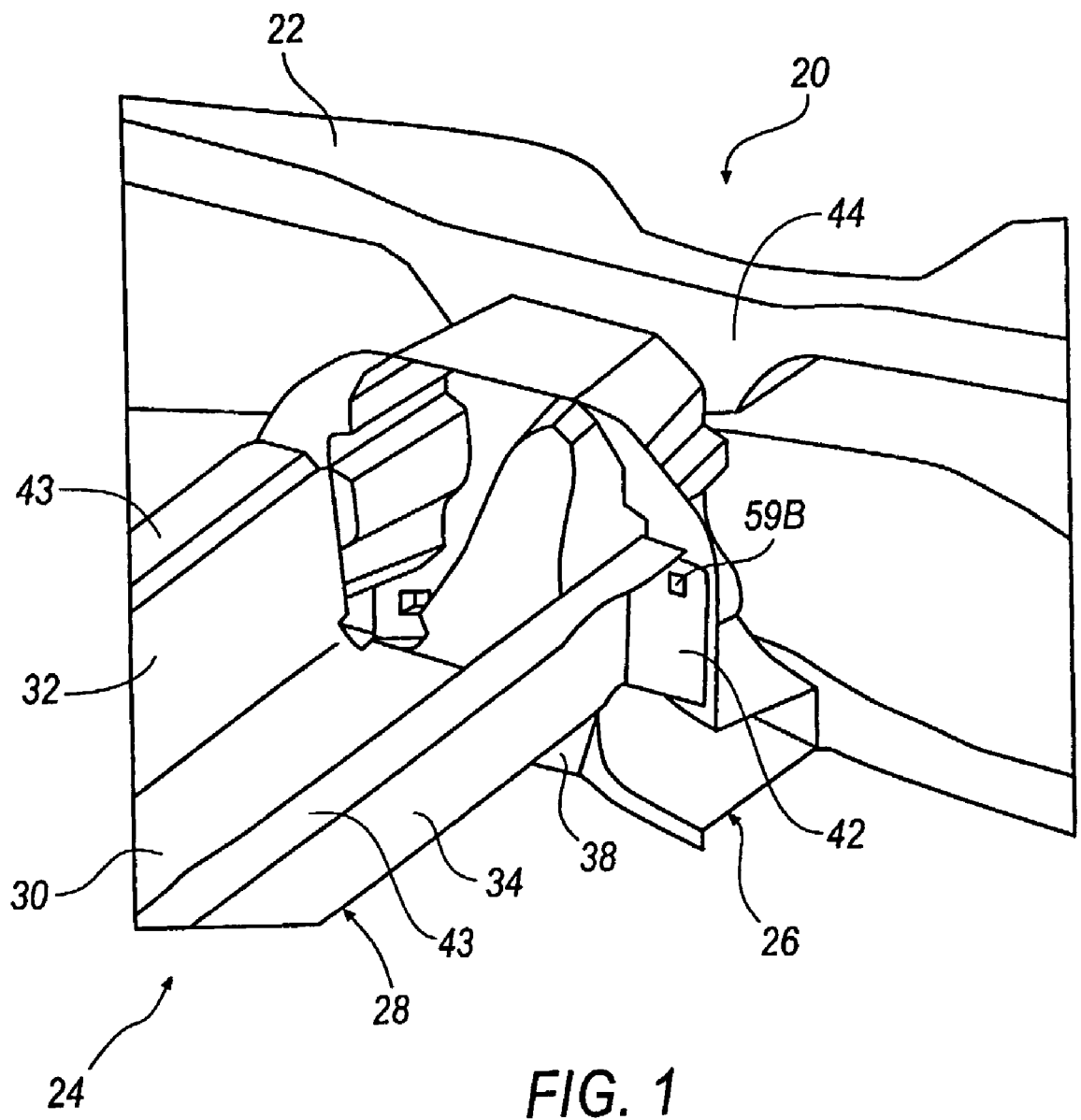
FIG. 1 is a perspective view of a vehicle bumper system according to an embodiment of the present invention.
Figure 2:
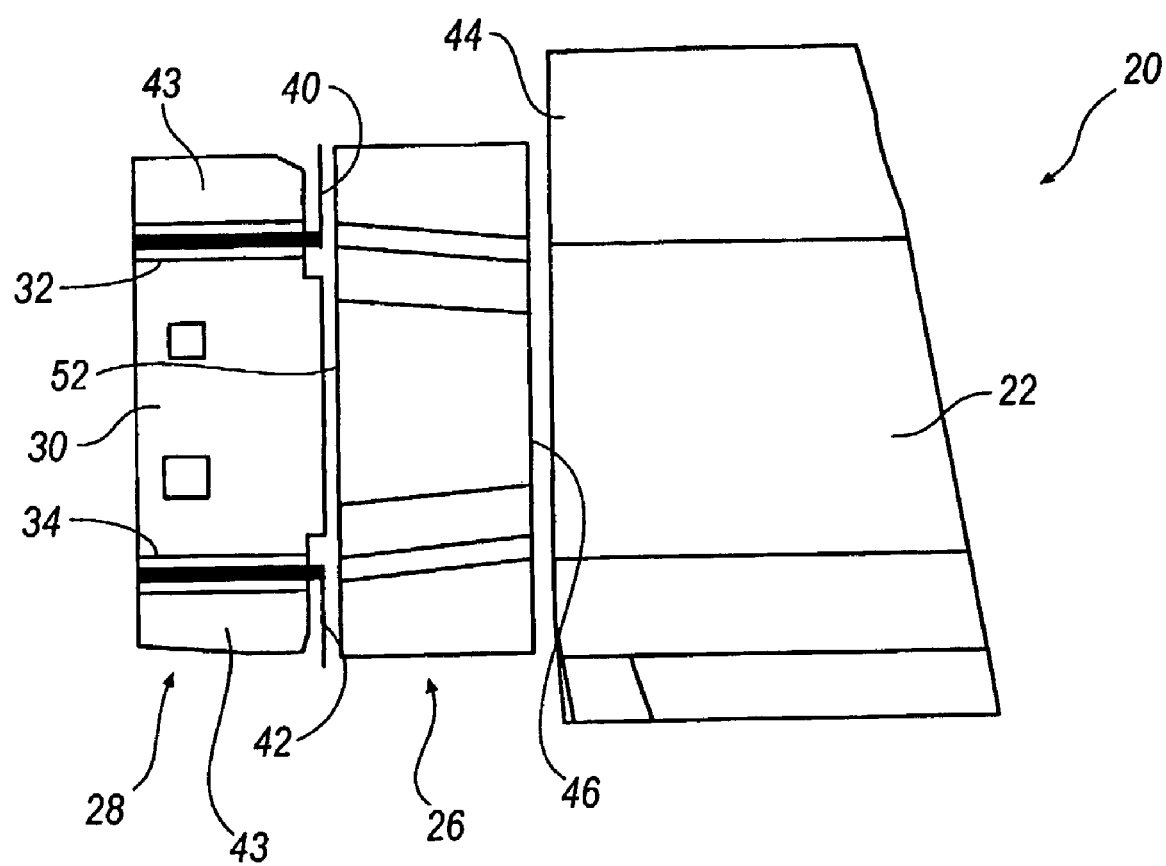
FIG. 2 is top view of the vehicle bumper system of FIG. 1.
Figure 3:
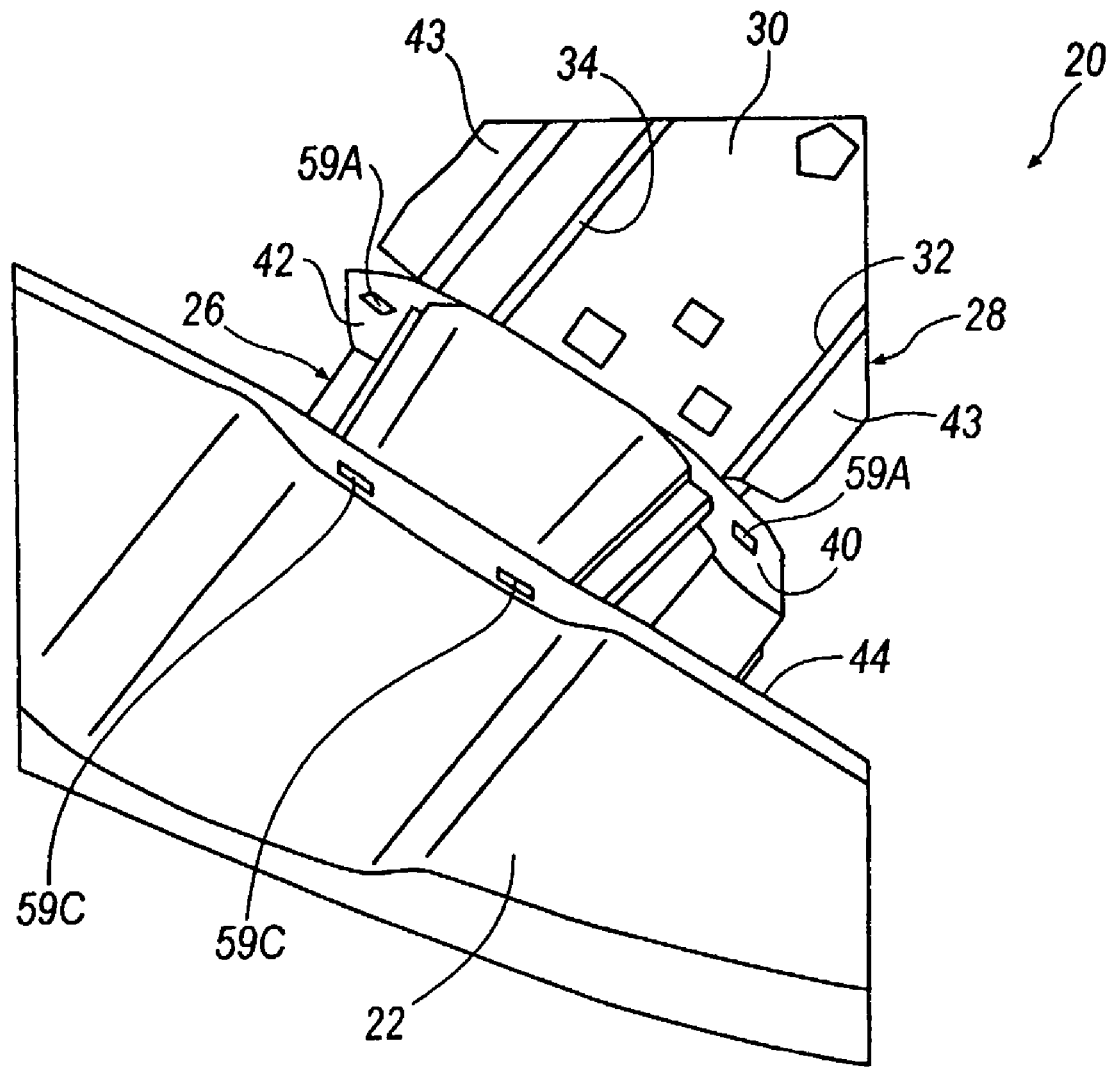
FIG. 3 is another perspective view of the vehicle bumper system of FIG. 1.
Figure 4:
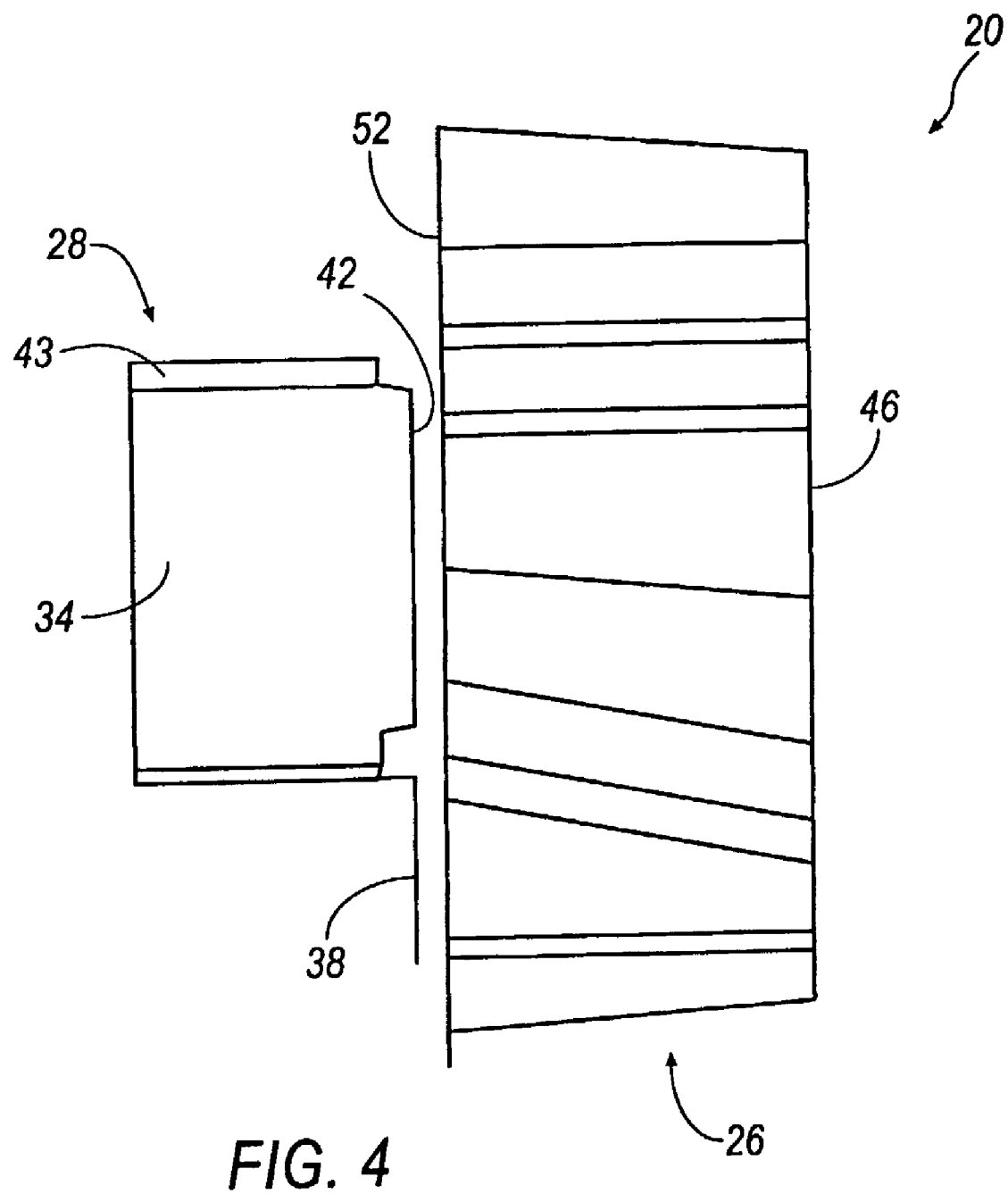
FIG. 4 is a side view of the vehicle bumper system of FIG. 1, showing a bumper mounting bracket prior to attachment to a rail in a vehicle frame.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Referring to FIGS. 1-4, a vehicle bumper system 20 is shown that includes a transverse bumper 22, a vehicle frame 24, and a pair of mounting brackets 26 (only one mounting bracket is shown in FIG. 1) for removably securing bumper 22 to the frame 24. In the illustrated embodiment, the frame 24 includes a pair of longitudinally extending rails 28 (only one rail is shown in FIG. 1), each having a generally U-shaped cross-section defined by a generally horizontal bottom wall 30 and two generally vertical side walls 32 and 34. The longitudinal ends of each of the three rail walls 30, 32 and 34 have mounting flanges 38, 40 and 42, respectively, for cooperative engagement with corresponding mounting surfaces of mounting bracket 26. The vehicle bumper system 20 may be used as the front or rear bumper of a vehicle. It is understood that mounting brackets 26 may also be secured to the frame 24 having a generally "I" shaped, square shaped, or any complex shaped cross-section.

As used in the description of the present embodiment, terms such as "horizontal" and "vertical" refer to the disclosed environment of a U-shaped rail that is oriented as shown, with the "open" side of the rail routing upwardly. For ease of description, those terms have also been used in the claims to discuss the interrelationship between the respective elements. Those terms are not intended to be limiting in an absolute sense, i.e., with respect to the plane of the Earth's surface. It should be understood that the embodiments could also be used where the rail and bracket were both oriented in a different angular position, as long as the three adjacent walls of the rail were similarly oriented relative to the bracket.

The bumper 22 is made of a structural material, such as steel, polyamide resin, or the like and may be configured in accordance with various bumper designs known in the art. In the illustrated embodiment, for example, bumper 22 is a curvilinear design having two relatively flat portions 44 adapted for engagement with the mounting bracket 26.

Referring to FIGS. 5-11, an embodiment of mounting bracket 26 is shown. In the illustrated embodiment, mounting bracket 26 includes a first end 46 (see FIGS. 2 and 5) having mounting surfaces 48 and 50 adapted for connection to bumper 22 and a second end 52 (see FIGS. 2 and 6) having mounting surfaces 54, 56 and 58 adapted for connection to rail mounting flanges 38, 40 and 42, respectively. To facilitate easy connection and removal of mounting bracket 26 from bumper 22 and rail 28, mounting surfaces 48, 50, 54, 56 and 58 each include at least one hole 59A that co-aligns with a corresponding hole 59B on mounting flanges 38, 40 and 42 (see FIG. 1) and a hole 59C on bumper 22 (see FIG. 3). Holes 59A, 59B and 59C are sized to receive a removable fastener (not shown), such as a nut and bolt arrangement, which is used to secure mounting bracket 26 to each of bumper 22 and rail 28. Those skilled in the art will appreciate that, for ease of economy of assembly, the bracket could be welded to one of the rail 28 and bumper 22, and bolted to the other.

Mounting bracket 26 is made from a material that provides the necessary structure to attach and support bumper 22 on rail 28, yet is deformable to absorb impact energy applied to bumper 22. In a particular implementation of one embodiment, mounting bracket 26 is made from draw quality steel (e.g., 2 mm in thickness) and is formed in a conventional stamping operation as a single, continuous, piece of metal, without joints. Alternatively, and without limitation, mounting bracket 26 may be made from a polymeric material, such as plastic, or deformable composite materials.

Figure 5:
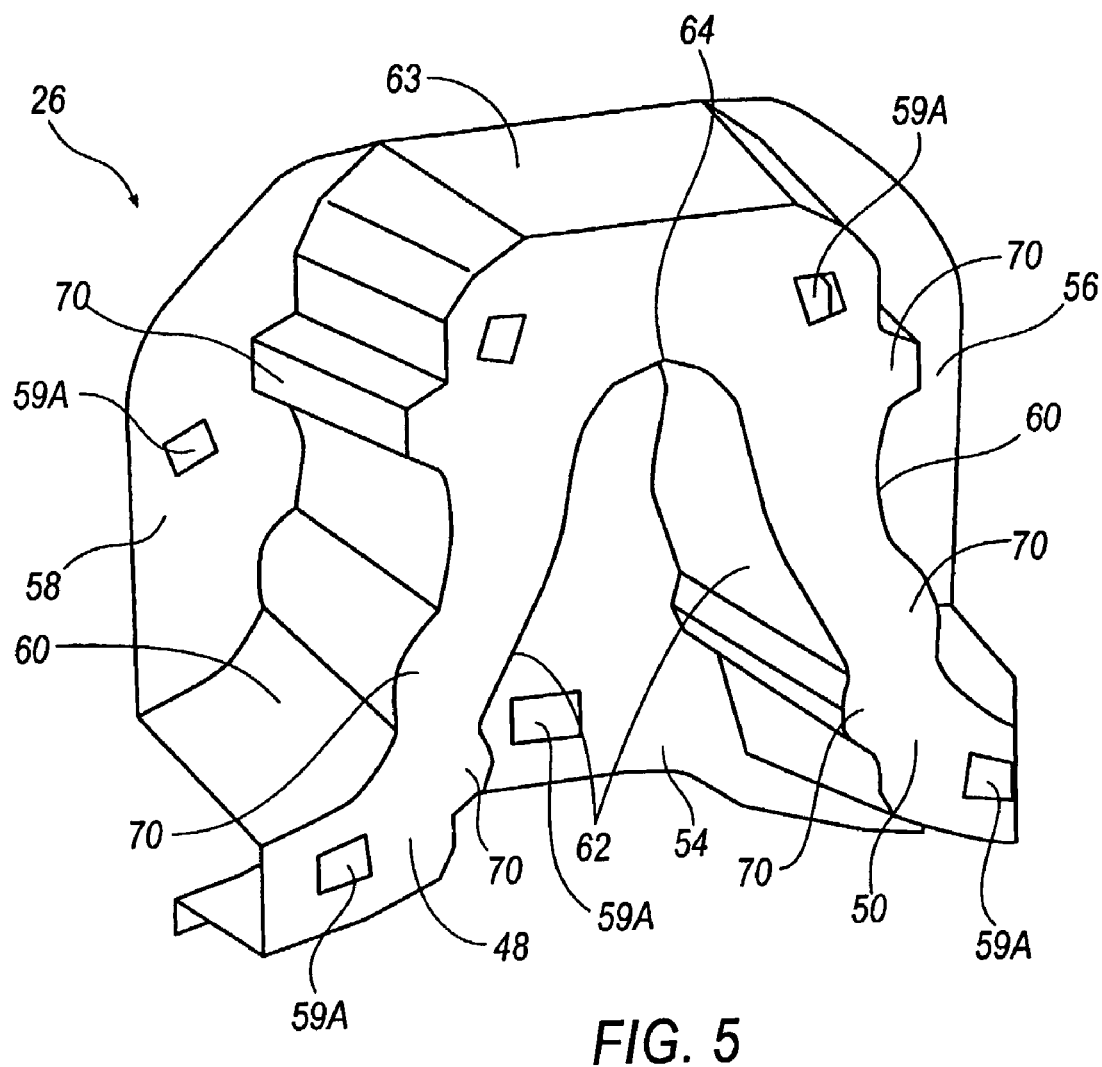
FIG. 5 is a perspective view of a vehicle bumper system mounting bracket according to an embodiment of the invention, showing a bumper-facing end of the mounting bracket.
Figure 6:
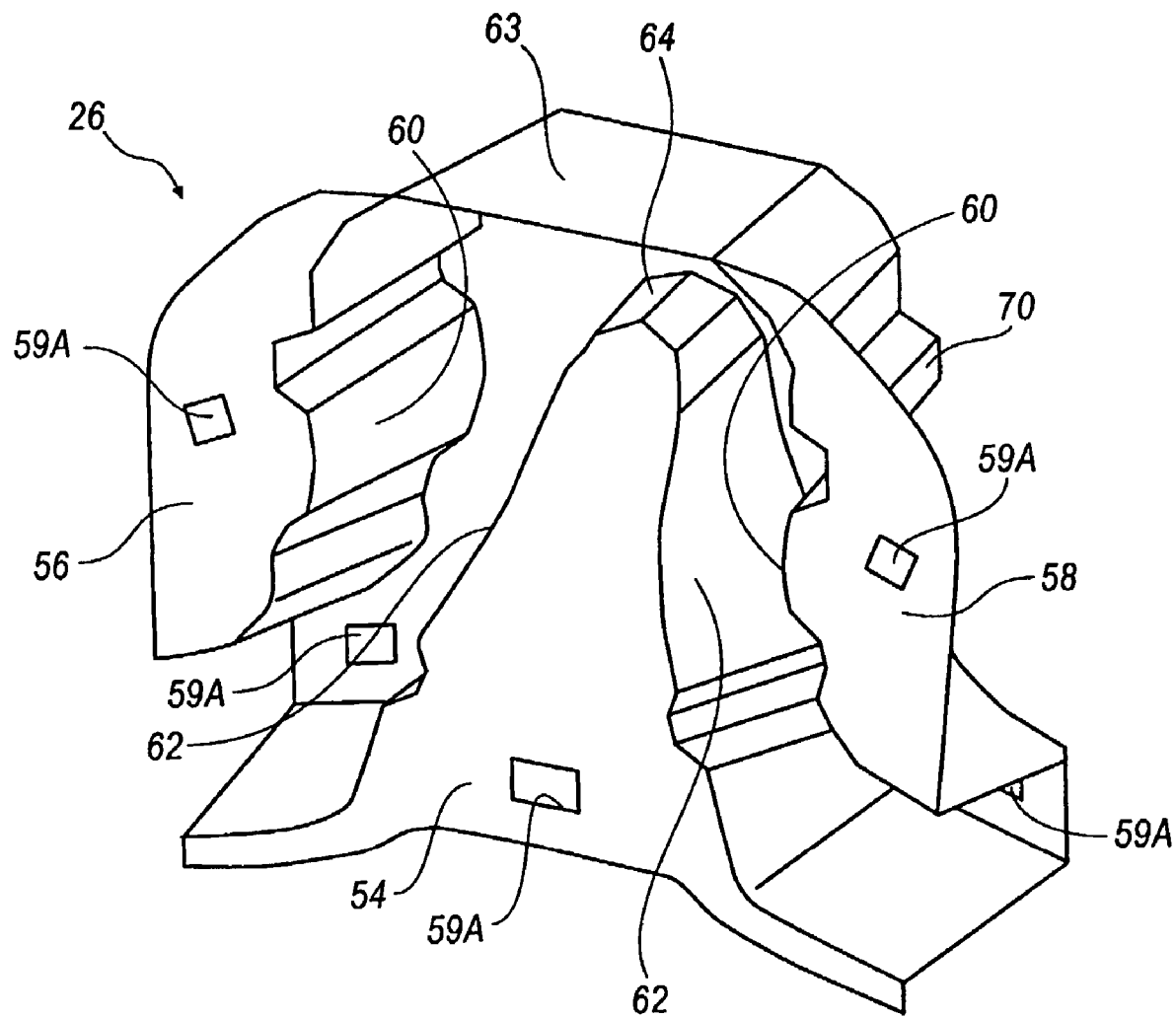
FIG. 6 is a perspective view of the mounting bracket of FIG. 5, showing a rail-facing end of the mounting bracket.
Figure 7:
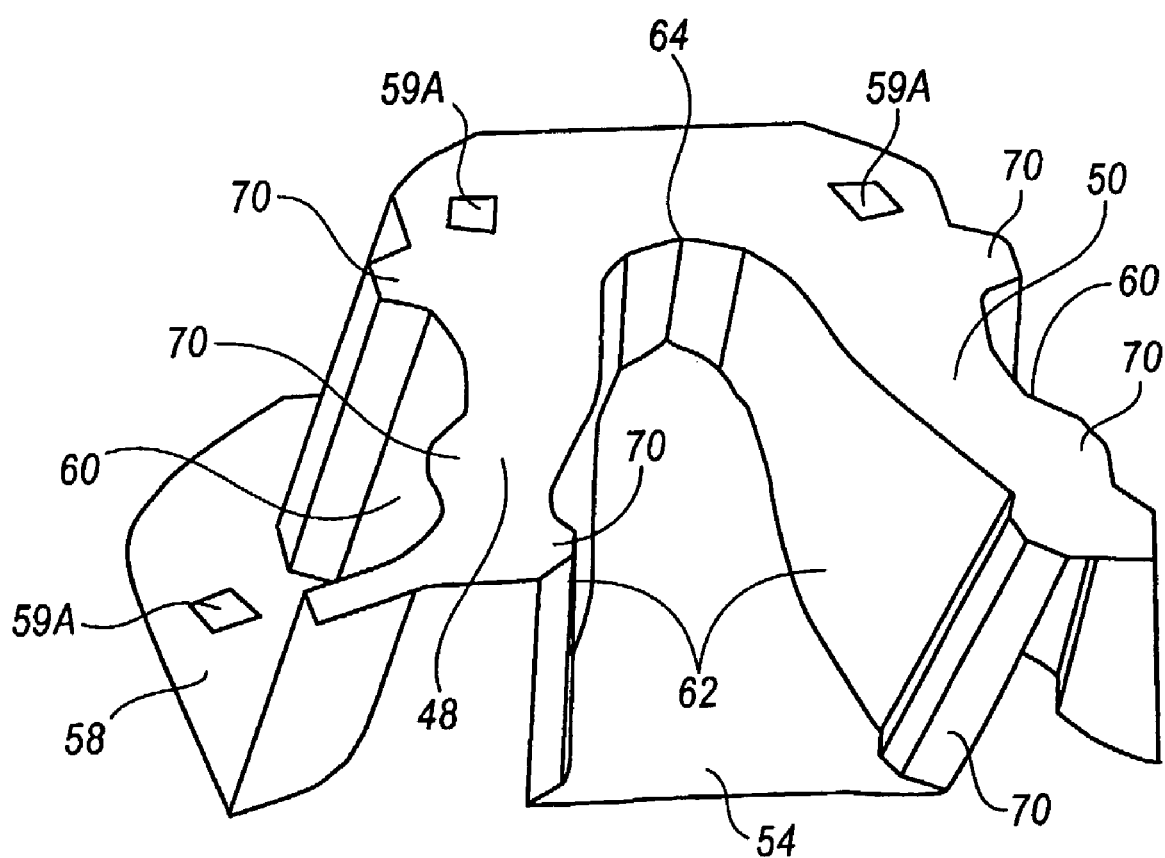
FIG. 7 is a perspective view of a portion of the mounting bracket of FIGS. 5 and 6 remaining after being cut by a first imaginary horizontal cutting plane, showing a W-shaped portion of the mounting bracket.

As shown in FIGS. 5 and 6, mounting bracket 26 includes first and second pairs of generally longitudinally extending walls 60 and 62, respectively, which are connected at their respective ends to the first and second end mounting surfaces 48, 50, 54, 56 and 58. The second pair of longitudinally extending walls 62 is located transversely between the first pair of longitudinally extending walls 60 so that the first and second pairs of longitudinally extending walls 60 and 62 define a generally W-shaped configuration at a selected imaginary horizontal cutting plane (see FIG. 7). The first pair of generally longitudinally extending walls 60 converge toward the first end 46 of mounting bracket 26, and the second pair of longitudinally extending walls 62 converge toward the second end 52. a portion of the mounting bracket 26 defines a generally W-shaped configuration an the imaginary cutting plane and a portion defines a generally U-shaped configuration.

With reference to FIG. 5, the first and second pair of longitudinally extending walls 60 and 62 are also generally upwardly converging. In an embodiment, the first pair of longitudinally extending walls 60 extend upwardly to an optional longitudinally extending wall 63 that separates walls 60. In contrast, the second pair of longitudinally extending walls 62 intersect and connect with each other at a common upper end 64.

As shown in FIG. 5, mounting surfaces 48 and 50 at first end 46 of mounting bracket 26 extend generally continuously between the upper and lower ends of both the first and second pairs of longitudinally extending walls 60 and 62, and join together the first ends of one wall from each of the first and second pairs of longitudinally extending walls 60 and 62. Similarly, mounting surfaces 48 and 50 also join together the first ends of the other wall from each of the first and second pairs of longitudinally extending walls 60 and 62, to thereby form a portion of the generally W-shaped configuration.

As shown in FIG. 6, mounting surfaces 56 and 58 at second end 52 of mounting bracket 26 extend generally continuously between the upper and lower ends of the first pair of longitudinally extending walls 60. Similarly, mounting surface 54 extends generally continuously between the upper and lower ends of the second pair of longitudinally extending walls 62. Mounting surface 54 also extends between the second pair of longitudinally extending walls 62, to thereby form another portion of the generally W-shaped configuration.

In an embodiment, the first pair of longitudinally extending walls 60 extends upwardly beyond the upper ends of the second pair of longitudinally extending walls 62. When so configured, the first pair of longitudinally extending walls 60 and mounting surfaces 48 and 50 at the first end 46 of mounting bracket 26 define a generally U-shaped configuration at imaginary horizontal cutting planes through the portions of mounting bracket 26 above the common upper end 64 of the second pair of longitudinally extending walls 62 (see FIG. 8).

A common problem exhibited during a vehicle collision is that the impact forces generated on bumper 22 are not always centered on the bumper 22, and further are not always parallel with a longitudinal centerline of the vehicle. When imbalanced and off-centered impact forces occur, there is a risk that the W-shaped portion of mounting brackets 26 may distort in a parallelogram-like fashion (so-called "matchboxing"), instead of crushing like an accordion. A parallelogram-like collapse is undesirable, since it typically absorbs much less energy than an accordion-like collapse. The reason is because in a parallelogram-like collapse, the mounting bracket material bends only at opposing ends of the longitudinally extending walls 60 and 62 (i.e., only bends at a front end near the bumper and at a rear end adjacent the vehicle frame). Contrastingly, in an accordion-like collapse, longitudinally extending walls 60 and 62 bend and crumple along multiple locations, including locations between their ends, with each of the bending locations absorbing energy from an impact.

Figure 8:
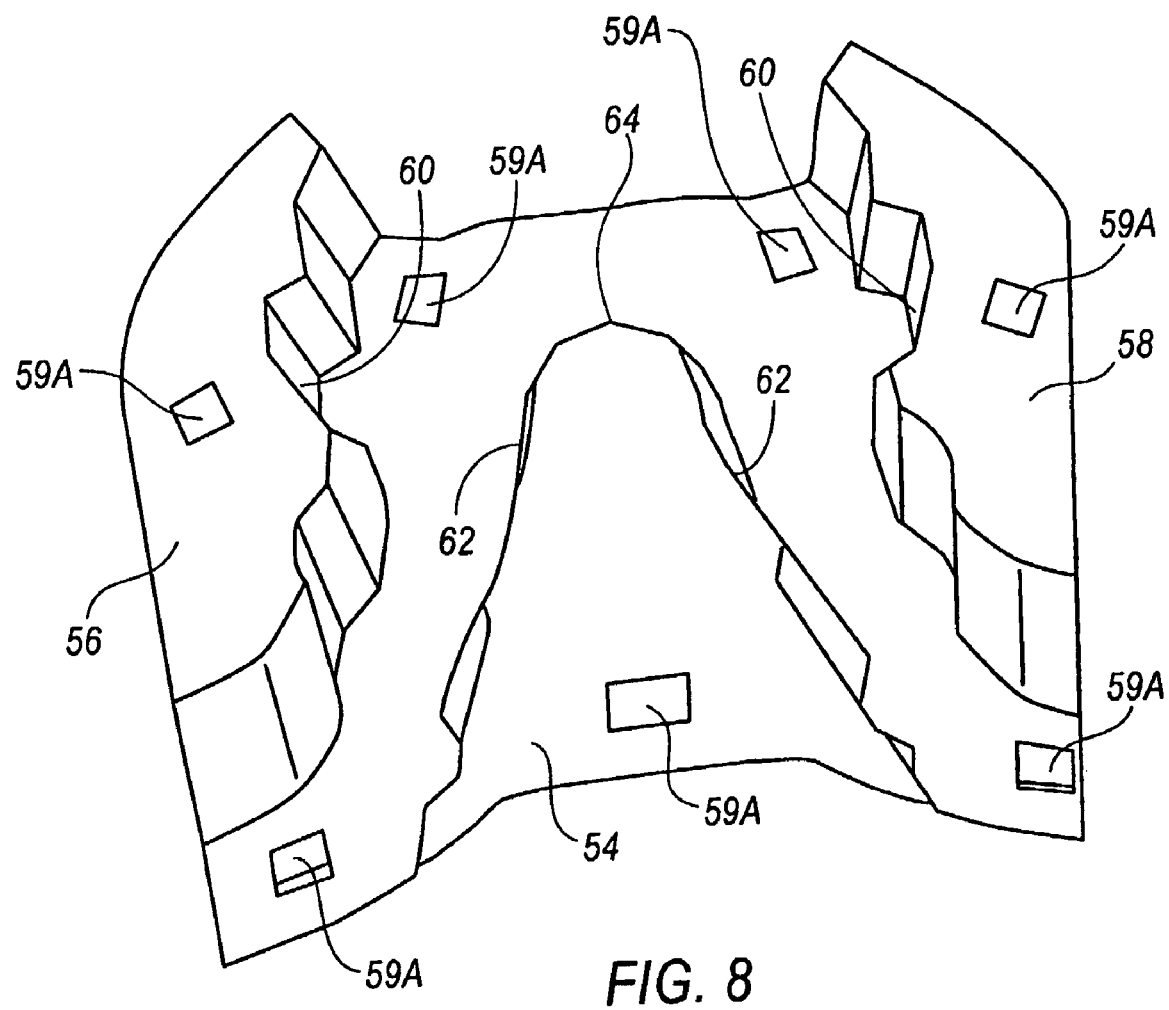
FIG. 8 is a perspective view of a portion of the mounting bracket of FIGS. 5 and 6 remaining after being cut by a second imaginary horizontal plane, showing a U-shaped portion of the mounting bracket.

To reduce the parallelogram or "matchbox" effect, the horizontal cross-section of mounting bracket 26 transitions from the generally W-shaped configuration in the lower portion of mounting bracket 26 (FIG. 7), to the generally U-shaped configuration in the upper portion of mounting bracket 26 (FIG. 8). This transition is characterized by the convergence of longitudinally extending walls 60 and 62 as they extend from their lower end to their upper end. Convergence of longitudinally extending walls 60 and 62 reduces the individual lateral shifting of walls 60 and 62 that results when walls 60 and 62 are subjected to shearing/torsional forces, and inhibits each walls' failure in a parallelogram-like collapse. Walls 60 and 62 define a portion of a bracket channel. In an embodiment, the walls 60 and 62 are angulated. Angulated means more than or less than ninety degrees.

Figure 9:
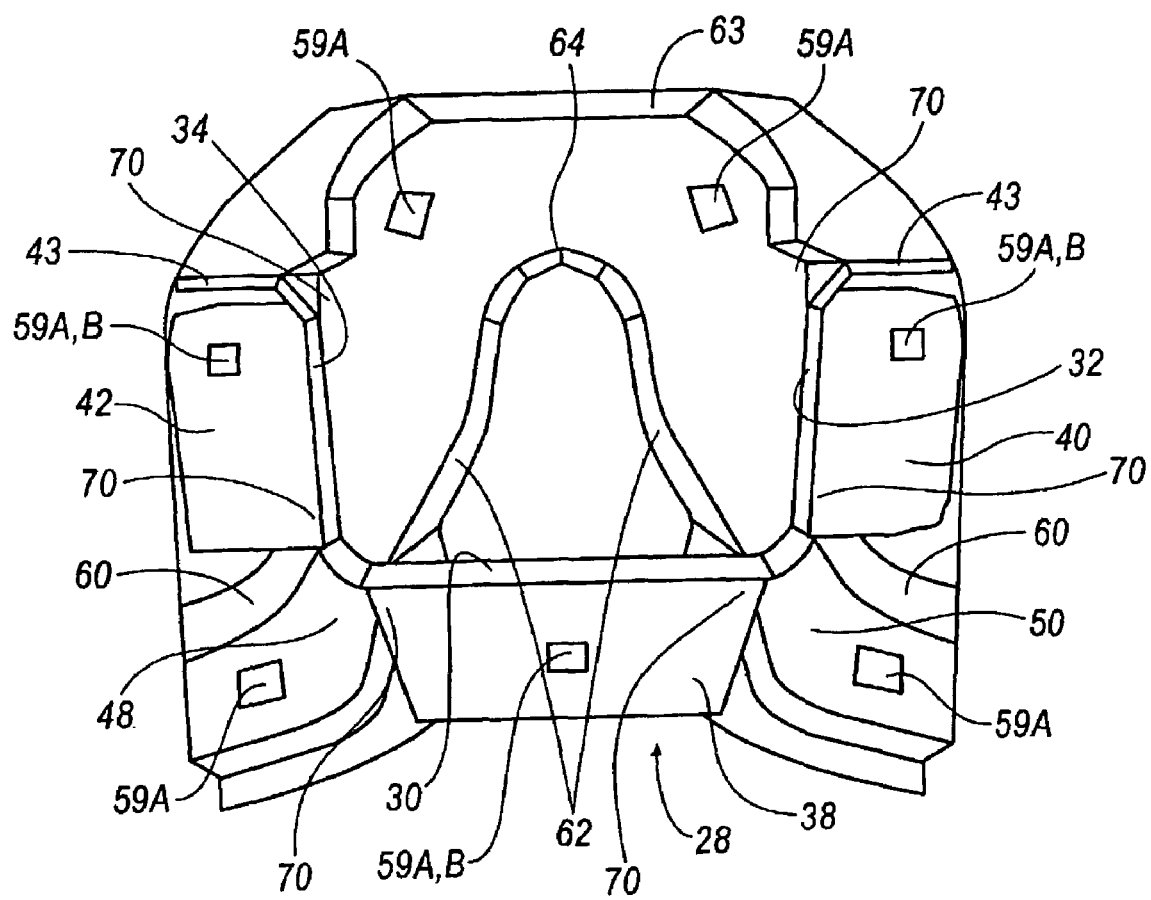
FIG. 9 is an end view of the rail used in the vehicle bumper system of FIG. 1, showing the mounting bracket of FIGS. 5-8 superimposed over the rail.
Figure 10:
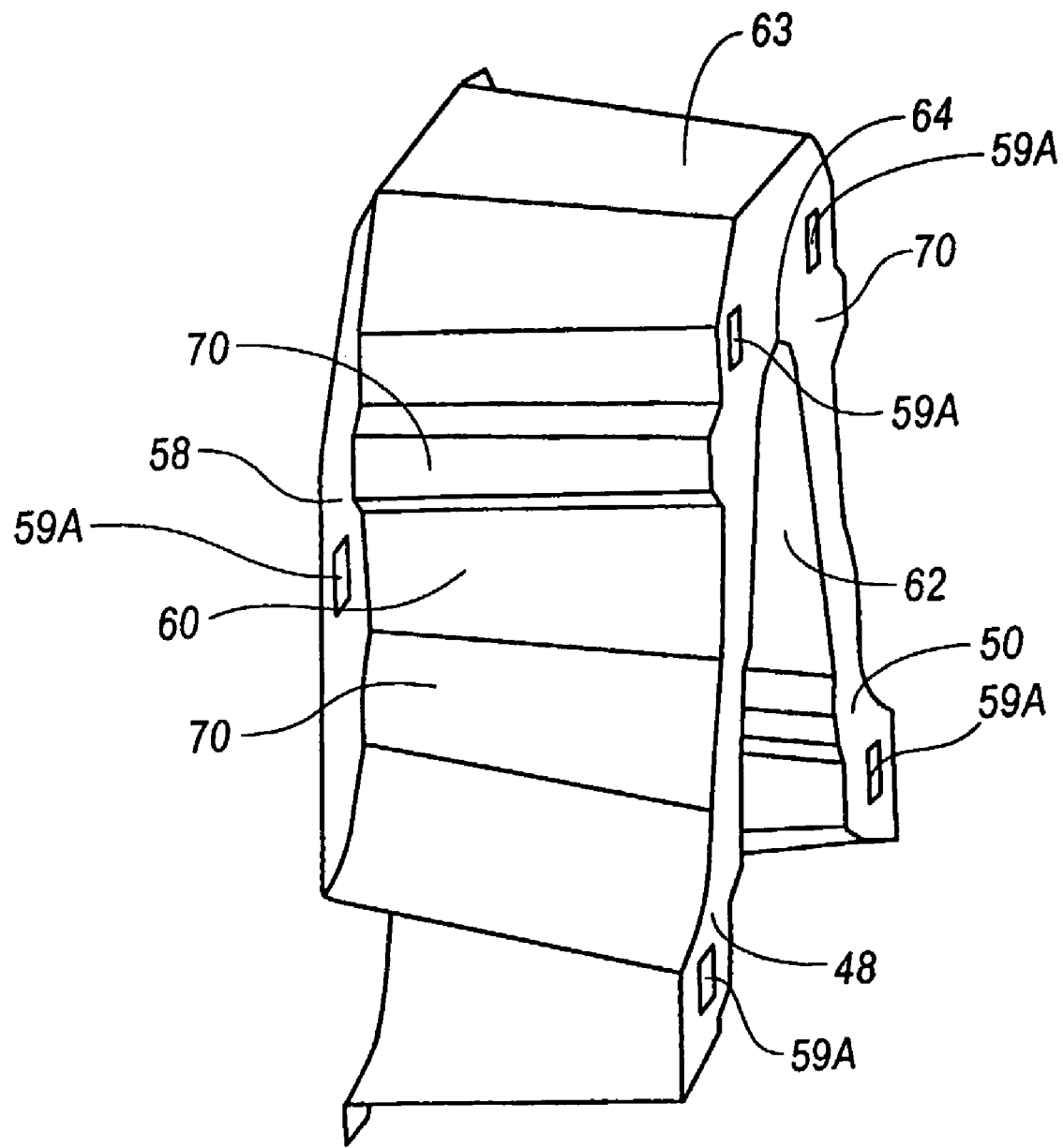
FIG. 10 is another perspective view of the mounting bracket illustrated in FIGS. 5-8.
Figure 11:
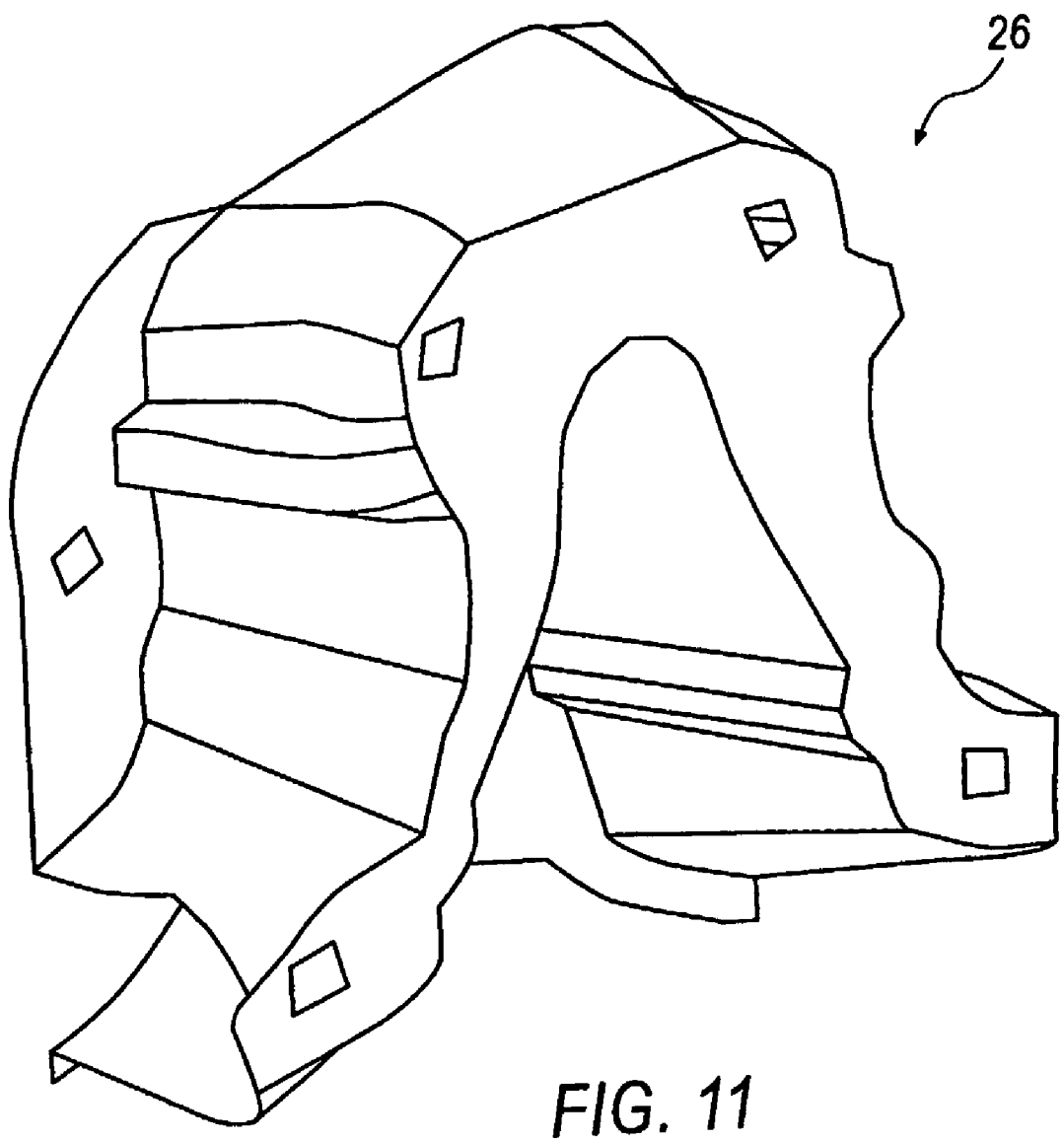
FIG. 11 is a perspective view of the mounting bracket of FIGS. 5-8 under load, showing the accordion-like collapse of the mounting bracket.

In addition to reducing the tendency of longitudinally extending walls 60 and 62 to "matchbox", the transition from a generally W-shaped profile to the generally U-shaped profile permits mounting bracket 26 to uniformly load the generally horizontal bottom wall 30 and the two generally vertical side walls 32 and 34 of rail 24. As shown in FIG. 9, the convergence of the first pair of longitudinally extending walls 60 allows imaginary longitudinal projections of walls 60 to intersect upper and lower portions of the generally vertical side walls 32 and 34 of rail 28. Similarly, the convergence of the second pair of longitudinally extending walls 62 allows imaginary longitudinal projections of walls 62 to intersect bottom wall 30 of rail 28.

The portions of first and second pairs of longitudinally extending walls 60, 62 that imaginarily project onto rail 28 may be defined by a longitudinally extending bead 70 in walls 60 and 62. Notably, each bead 70 may be positioned to intersect rail 28 proximate a structurally significant portion of rail 28, such as the transition between bottom wall 30 and side walls 32 and 34, or the transition between side walls 32, 34 and upper longitudinally extending flanges 43 of rail 28. Thus, the lower portion of mounting bracket 26 may be adapted to load the lower, closed portion of rail 28 and the upper portion of mounting bracket 28 may be adapted to straddle the upper, open portion of rail 28, while uniformly loading side walls 32 and 34.

As will be appreciated, mounting bracket 26 significantly enhances the energy management efficiency of bumper system 20, since mounting bracket 26 is designed to collapse before the rail-buckling load is reached. Thus, in relatively low energy bumper impacts that exceed the energy dissipation capability of bumper 22 alone, mounting bracket will collapse and absorb the excess energy before any damage occurs in rail 28. It is also understood that in one embodiment, the use of straight or curved angulated walls form a bracket channel in the mounting bracket 26 that provides uniform loading of the rail 28.

Among other features of the embodiments described herein, the W-shaped portion of mounting bracket 26 provides the surfaces necessary to secure mounting bracket 26 to bumper 22 and rail 28 and, importantly, the wall material needed to collapse in an accordion-like fashion to absorb energy as bracket 26 is crushed during an impact. To inhibit parallelogram-like deformation of the W-shaped portion, the W-shaped portion of bracket 26 transitions into a U-shaped configuration as the first and second pairs of longitudinally extending walls 60 and 62 upwardly converge. Further, the convergence of the first and second pairs of longitudinally extending walls 60 and 62 allow imaginary longitudinal projections of walls 60 and 62 to intersect structurally significant portions of the generally vertical side walls 32 and 34 and bottom wall 30 of rail 28, to uniformly load the walls of rail 28.

The embodiments herein have been particularly shown and described, which are merely illustrative of the best mode for carrying out the invention. It should be understood by those skilled in the art that various alternatives to the embodiments described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An automotive vehicle bumper system comprising a transverse bumper, a vehicle frame and a pair of mounting brackets for removably securing the bumper to the frame; the frame including a pair of longitudinally extending rails each having a generally U-shaped cross-section comprising a generally horizontal bottom wall and two generally vertical side walls, the longitudinal ends of each of the three rail walls having mounting flanges for cooperative engagement with corresponding mounting surfaces of the mounting bracket; an improved mounting bracket capable of controlled deformation and energy absorption in response to impacts to the bumper including:

a first end comprising mounting surfaces adapted for connection to said bumper, and a second end comprising mounting surfaces adapted for connection to said rail mounting flanges, said second end mounting surfaces being arranged and positioned for engagement with said three rail mounting flanges;

first and second pairs of generally longitudinally extending walls, each of said longitudinally extending walls connected at its respective ends to said first and second end mounting surfaces;

said second pair of longitudinally extending walls being located transversely between said first pair of longitudinally extending walls so that said first and second pairs of walls define a generally W-shaped configuration at a selected imaginary horizontal cutting plane, with said first pair of walls converging toward said first end, and said second pair of walls converging toward said second end; and said first pair of longitudinally extending walls being generally upwardly converging, and said second pair of longitudinally extending walls being generally upwardly converging.

2. The vehicle bumper system of claim 1, wherein said second pair of longitudinally extending walls intersect and connect with each other at their upper ends.

3. The vehicle bumper system of claim 1, wherein said mounting surfaces at said first end extend substantially continuously between the upper and lower ends of both said first and second pairs of longitudinally extending walls, and join together said first ends of one wall from each of said first and second pairs of longitudinally extending walls, and also join together said first ends of the other wall from each of said first and second pairs of longitudinally extending walls, to thereby form a portion of said generally W-shaped configuration.

4. The vehicle bumper system of claim 1, wherein said mounting surfaces at said second end extend substantially continuously between the upper and lower ends of said first pair of longitudinally extending walls, and also extend substantially continuously between the upper and lower ends of said second pair of longitudinally extending walls and between said second pair of longitudinally extending walls to thereby form a portion of said generally W-shaped configuration.

5. The vehicle bumper system of claim 1, wherein said first pair of longitudinally extending walls extend upwardly beyond said upper ends of said second pair of longitudinally extending walls, whereby said first pair of longitudinally extending walls and said mounting surfaces at said first end of said bracket define a generally U-shaped configuration at imaginary horizontal cuffing planes through the portions of the bracket above said upper ends of said second pair of longitudinally extending walls.

6. The vehicle bumper system of claim 1, wherein imaginary longitudinal projections of said first pair of longitudinally extending walls intersect upper and lower portions of said side walls of said rail, and imaginary longitudinal projections of said second pair of longitudinally extending walls intersect said bottom wall of said rail.

7. The vehicle bumper system of claim 1, wherein said first and second pairs of generally longitudinally extending walls include a bead, wherein imaginary longitudinal projections of each bead intersect said rail proximate a structurally significant portion of said rail.

8. The vehicle bumper system of claim 1, wherein said bumper bracket is formed as a single, continuous, piece of metal, without joints.

9. A vehicle bumper system comprising:
- a mounting bracket adapted to be disposed between a vehicle frame and a bumper;
- first and second mounting surfaces of said mounting bracket adapted to be secured to said vehicle frame and bumper, respectively;
- first and second pairs of generally longitudinally extending walls interconnecting said first and second mounting surfaces, said first pair of walls converging toward said first mounting surface, and said second pair of walls converging toward said second mounting surface;
- said mounting bracket being adapted to absorb an impact to said bumper by the deformation of said first and second pairs of longitudinally extending walls.

10. The vehicle bumper system of claim 9, wherein said mounting bracket includes a generally W-section at a first end.

11. The vehicle bumper system of claim 9, wherein said mounting bracket includes a generally U-section at a second end.

12. The vehicle bumper system of claim 9, wherein said mounting bracket collapses generally uniformly at a predetermined load.

13. The vehicle bumper system of claim 9 wherein said deformation is in the form of an accordion-like collapse of said walls.

14. The vehicle bumper system of claim 9 wherein said mounting bracket is formed from one of a steel, aluminum, polyamide resin and a plastic material, and is in the form of a single, continuous, piece of material, without any joints.

15. The vehicle bumper system of claim 9 wherein each pair of said first and second pairs of generally longitudinally extending walls also converge in a direction generally perpendicular to the direction of convergence specified in claim 9.

16. A vehicle bumper system comprising:
- a mounting bracket adapted to be disposed between a vehicle frame and a bumper;
- first and second mounting surfaces of said mounting bracket adapted to be secured to said vehicle frame and bumper, respectively; first and second pairs of generally longitudinally extending walls interconnecting
- said first and second mounting surfaces, said first pair of walls converging toward said first mounting surface, and said second pair of walls converging toward said second mounting surface;
- said mounting bracket including a generally W-section adjacent one of said first and second mounting surfaces, and a generally U-section adjacent the other of said first and second mounting surfaces;
- said mounting bracket being adapted to absorb an impact to said bumper by the deformation of said first and second pairs of longitudinally extending walls.

17. The vehicle bumper system of claim 16 wherein said deformation is in the form of an accordion-like collapse of said walls.

18. The vehicle bumper system of claim 16 wherein said mounting bracket is formed from one of a steel, aluminum, polyamide resin and a plastic material, and is in the form of a single, continuous, piece of material, without any joints.

19. The vehicle bumper system of claim 16 wherein each pair of said first and second pairs of generally longitudinally extending walls also converge in a direction generally perpendicular to the direction of convergence specified in claim 16.

* * * * *

UNITED STATES PATENT AND TRADEMARK OFFICE
CERTIFICATE OF CORRECTION

PATENT NO.         : 7,461,878 B2                                                      Page 1 of 1
APPLICATION NO. : 11/597778
DATED              : December 9, 2008
INVENTOR(S)        : Hongliang Ji et al.

It is certified that error appears in the above-identified patent and that said Letters Patent is hereby corrected as shown below:

In Claims:

Column 6, Claim 5, line 54, change "cuffing" to -- cutting --

Column 8, Claim 16, lines 7-14,

"first and second mounting surfaces of said mounting bracket adapted to be secured to said vehicle frame and bumper, respectively; first and second pairs of generally longitudinally extending walls interconnecting said first and second mounting surfaces, said first pair of walls converging toward said first mounting surface, and said second pair of walls converging toward said second mounting surface;"

should read

-- first and second mounting surfaces of said mounting bracket adapted to be secured to said vehicle frame and bumper, respectively; first and second pairs of generally longitudinally extending walls interconnecting said first and second mounting surfaces, said first pair of walls converging toward said first mounting surface, and said second pair of walls converging toward said second mounting surface; --

Signed and Sealed this

Twenty-fourth Day of November, 2009

David J. Kappos
*Director of the United States Patent and Trademark Office*